United States Patent [19]

Marschke

[11] Patent Number: 5,484,499
[45] Date of Patent: Jan. 16, 1996

[54] METHOD AND APPARATUS FOR LAYING UP LAMINATES OF ADHESIVE BACKED SHEETS

[75] Inventor: Carl R. Marschke, Phillips, Wis.

[73] Assignee: Converex, Inc., Madison, Wis.

[21] Appl. No.: 168,812

[22] Filed: Dec. 17, 1993

[51] Int. Cl.[6] .................... B32B 31/00; B32B 31/12; B32B 31/18; B32B 35/00
[52] U.S. Cl. .................. 156/193; 156/190; 156/229; 156/250; 156/269; 156/291; 156/446; 156/458; 156/459; 156/494; 156/495; 156/510; 242/412; 242/522; 242/523.1; 242/526; 242/571; 242/571.4
[58] Field of Search ..................... 156/193, 494, 156/185, 229, 446, 459, 184, 443, 458; 242/147 R, 410, 412, 531, 532.3, 544, 1, 412.1, 522, 523.1, 526, 538.1, 571, 610, 910

[56] References Cited

U.S. PATENT DOCUMENTS

| | | | |
|---|---|---|---|
| 948,207 | 2/1910 | Coon | 242/529 |
| 2,018,852 | 10/1935 | Hart | 242/412 |
| 2,805,828 | 9/1957 | Bachman | 242/529 |
| 2,876,893 | 3/1959 | Blackford et al. | 242/1 |
| 3,086,725 | 4/1963 | Zernov | 242/526 |
| 3,123,315 | 3/1964 | Couzens | 242/526 |
| 3,433,355 | 3/1969 | Smith | 242/571 X |
| 3,684,141 | 8/1972 | Hall | 225/65 |
| 3,704,835 | 12/1972 | Harley | 242/523.1 |
| 3,752,412 | 8/1973 | Byrt | 242/523.1 |
| 3,899,075 | 8/1975 | Hall et al. | 242/610 X |
| 4,208,019 | 6/1980 | Dusenberg | 242/533.1 X |
| 4,722,490 | 2/1988 | Doerfel | 242/538.1 X |
| 4,883,553 | 11/1989 | David et al. | 156/193 |
| 5,002,628 | 3/1991 | Schnebly | 156/510 X |
| 5,014,924 | 5/1991 | Nowisch et al. | 242/523.3 X |

*Primary Examiner*—David A. Simmons
*Assistant Examiner*—M. Curtis Mayes
*Attorney, Agent, or Firm*—Andrus, Sceales, Starke & Sawall

[57] ABSTRACT

A paper web having a longitudinally extending zone coat of adhesive is continuously wound around the cylindrical surface of a rotating drum for a selected number of wraps to form a multi-layer cylindrical master stack. Web tension is controlled during winding to cause each succeeding wrap to be placed in relatively greater tension, so that when the completed cylindrical stack is cut transversely and unwrapped from the drum, equalization of the tensile stresses in the web wraps results in a flat master stack of rectangular sheets of equal length. The stack is further processed by cutting along transverse and longitudinal cut lines to form individual pads of adhesive-backed notes. Tension control may be based directly on the increase in drum radius resulting from the buildup of web wraps or by maintenance of print pattern register between continuous equally spaced print patterns in overlying wraps. By utilizing a pair of rotatable lay-up drums which are translatable between preparatory and wrapping positions, the process of the present invention may be operated continuously. A lay-up drum with a compressible outer surface may be used whereby the initial web wraps will result in compression of the drum, some reduction in drum diameter, and a reduction in the tensile stress in initially applied wraps. The lay-up process is completed in the manner set forth above.

23 Claims, 4 Drawing Sheets

METHOD AND APPARATUS FOR LAYING UP LAMINATES OF ADHESIVE BACKED SHEETS

BACKGROUND OF THE INVENTION

The present invention relates to the manufacture of multi-layer stacks of adhesive backed sheets and, more particularly, to a system for the continuous manufacture of pads of repositionable adhesive-backed sheet products or laminates of permanently adhered sheets.

The development of low tack adhesives comprising inherently tacky polymeric microspheres and systems for applying such adhesives to paper sheets in a manner inhibiting transfer of the tacky microspheres from the sheet to another surface has led to a broad line of easily removable and repositionable products in pad form. The notes comprising these pads each typically has a narrow strip of adhesive along one edge which holds the note against the underlying note in the pad or on another flat surface to which the note may be adhered after removal from the pad. As is well known in the art, small pads of notes are cut from large master stacks of sheets which are zone coated with the adhesive, laid up to form a stack of the desired number of sheets, and the stack is cut with multiple longitudinal and transverse cuts to form the smaller individual pads.

It was also recognized early in the development of these note pads that conventional sheet stacking techniques and apparatus were unsuitable because of the presence of the adhesive coating on one side of the sheet, which essentially precludes any sliding movement between sheets as they are stacked. One system which was developed to accommodate vertical stacking of large sheets of paper having zone coated adhesive strips on one side is shown in U.S. Pat. No. 4,743,319. In this system, large rectangular paper sheets having the zone coatings facing upwardly are individually conveyed horizontally into a backstop on the far end of a stacking bay and then allowed to drop vertically downward atop the preceding sheet until a stack of a desired number of sheets has been built up. Although this system recognizes the difficulty in squaring a stack of sheets having an adhesive coating on one side and purports to avoid the problem by direct vertical stacking, it is believed that sheet alignment and the maintenance of stack squareness remains a problem wherever positive control of the sheet is lost in the stacking process.

The method and apparatus described in U.S. Pat. No. 5,209,810 provide a solution to the sheet control and stack alignment problems inherent in prior art systems used to lay up stacks of adhesive-backed sheets. In accordance with that invention, a continuous paper web having zone coated adhesive strips is continuously applied to a series of recirculating pallets, onto each of which a length of web corresponding to the length of pallet is applied as the pallets and webs are fed in end-to-end register through a nip roll. A synchronized knife severs the web along the abutting edges of adjacent pallets and each pallet receives an additional sheet with each recirculating passage through the lay up station.

The maintenance of positive control of the web until sheets are laid in precise position on the pallet to form a master pad or master stack is the key to successful operation of the system disclosed in the preceding patent. That system has been successfully operated to accurately lay up master stacks of large adhesive backed sheets on a continuous basis, which stacks may be cut into a multiplicity of small note pads in a known manner. It has been found, however, that the principle of continuous web control can be applied in an even more efficient manner to lay up large sheets of adhesive-backed paper material on a continuous basis.

Indeed, the system of the invention to be described herein is broadly applicable to the lay up of sheets of other web materials than paper, webs which are zone coated or provided with a full coat of adhesives which may be repositionable or permanent, and to produce layered sheet products which are intended to be taken apart or to be permanent laminates.

SUMMARY OF THE INVENTION

In accordance with one embodiment of the present invention, a paper web provided with a zone coat of adhesive is continuously wound around the cylindrical surface of a rotating drum for a selected number of wraps to form a multi-layer cylindrical master stack. Web tension is controlled during winding to cause each succeeding wrap to be in relatively greater tension, so that when the completed cylindrical master stack is cut transversely and unwrapped from the drum, stabilization of the tensile stress differentials in the web wraps results in a flat master stack or laminate of rectangular sheets of equal length.

In accordance with one embodiment of the method of the present invention, a multi-layer stack of sheets is laid up from a continuous web which has an adhesive coating on one side by a method comprising the steps of: attaching a first leading edge of the web to the surface of a first rotatable drum; rotating the drum to cause winding of a selected number of wraps to form a multi-layer cylindrical master stack; controlling web tension during winding to cause each succeeding wrap of the web to be in relatively greater tension than the preceding wrap; and, cutting through the formed cylindrical master stack transversely of the web.

Suitable drum drive means is provided for rotating the drum and web tension during winding is controlled by controlling the torque output of the drum drive means. The web is supplied to the drum by rotatable web feed means, and the preferred method includes the step of driving the web feed means at a constant speed.

The preferred method of the present invention includes the additional steps of: providing a second rotatable drum; mounting the first and second drums on opposite ends of a rotatable transfer arm; positioning the first drum in a web attaching position; rotating the first drum during the web attaching step; rotating the transfer arm during winding to move the second drum to the web attaching position; and, repeating the web attaching step on the second drum by cutting the web thereon to provide a second leading edge for the second drum and a trailing edge for the final wrap on the first drum. The method of the present invention is particularly suitable for laying up sheets from a continuous paper web to which a continuous zone coat of a low tack repositionable adhesive material has been applied. In accordance with the presently preferred embodiment of the method of the present invention, there are included the steps of: attaching a backing sheet to the surface of the drum prior to attaching the web, and attaching the web to the backing sheet by placing the adhesive side of the web against the sheet. Alternatively, the backing sheet may be wrapped around the drum and temporarily held thereon by vacuum until the wrapping of the web has begun. Further, the backing sheet could be omitted and the drum coated with a release agent with transfer of the master stack or laminate onto a backing sheet, if desired, after removal from the drum.

In accordance with the preferred embodiment of the present invention, the backing sheet applied to the lay-up drum has a length equal to the circumference of the drum, and the method includes the additional steps of providing a rotary web cutoff knife having a blade positioned transversely of the web, and moving the cutoff knife into cutting engagement with the web to provide the leading edge in register with the edge of the backing sheet. The method also preferably includes the preliminary steps of: continuously advancing the web past the first and second lay-up drums; accumulating the advancing web; initially attaching the web to the first drum by causing the rotating drum surface to contact the moving web; and, cutting the web on the drum surface to provide the first leading edge.

A variant method of the present invention includes the steps of: advancing the web tangentially with respect to the surface of a first rotatable lay-up drum located in a web attaching position; rotating the first drum at a peripheral surface speed equal to the speed of the advancing web; causing the web to contact and become attached to the surface of the first drum; severing the portion of the web downstream of the attachment; winding the attached web on the rotating first drum for a selected number of wraps to form a first multi-layer cylindrical stack; controlling web tension during winding to create relatively greater tension in each succeeding wrap of the web; and, cutting the cylindrical master stack transversely of the web to form a flat master stack of rectangular sheets of equal length. The method also preferably comprises the preliminary steps of providing either or both sides of the web with a uniformly repeating pattern of printing or other indicia, and providing the surface of the first drum with indexing marks corresponding to the repeating pattern, initially attaching the web to register the indicia with an index mark, and including the additional step of controlling web tension to maintain register of the repeating pattern with the index marks.

The variant method of the present invention may also include steps of: mounting the first rotatable lay-up drum and a second rotatable lay-up drum on opposite ends of a rotatable transfer arm; rotating the transfer arm during winding to move the second lay-up drum to the web attaching position; and, repeating the steps of the above described variant method for the second lay-up drum upon completion of the first multi-layer cylindrical stack.

The present invention also includes an apparatus for laying up the multi-layer stack of adhesive backed sheets which comprises a first rotatable and translatable lay-up drum having its axis of rotation parallel to the web and normal to the direction of travel, a rotatable and translatable web attaching and severing roll having its axis of rotation parallel to the axis of the first drum, means for advancing the web between and tangentially with respect to the surfaces of the first drum and the roll, means for rotating the drum and the roll at respective peripheral surface speeds corresponding to the speed of the web, means for translating the roll into engagement with the web to move the web into attaching engagement with the drum (and backing sheet if present) and to sever the attached web from the web portion downstream thereof, means for rotating the drum to wind the web thereon for a selected number of wraps applied in a manner to create relatively increasing tension in each succeeding wrap to form a multi-layer cylindrical master stack, and means for cutting the cylindrical stack transversely of the web to form a flat master stack of adhesively attached rectangular sheets of equal length.

The apparatus also preferably includes a second rotatable and translatable lay-up drum, a transfer arm rotatably supporting the first and second lay-up drums on opposite ends thereof, means for rotating the transfer arm to translate the lay-up drums between a web attaching position and a web wrapping position, wherein said attaching and severing roll is operable to simultaneously attach the web to the lay-up drum located in the attaching position and sever the web to form the tail end of the final wrap on the lay-up drum located in the wrapping position. Means are also preferably provided for maintaining tension in the tail end of the final wrap after the web is severed.

Both the method and apparatus of the present invention, in their preferred embodiments or in alternate embodiments, may utilize web materials other than paper. In addition, the web material may be provided with a full coat of a permanent adhesive, instead of a zone coat of a low tack repositionable adhesive, and a web wrapped to form a permanent laminated product of any desired thickness. Also, the lay-up drum may be provided with a compressible surface in which the initial drum diameter is reduced during wrapping with the wrapping process comprising a combination of drum compression and controlled web tension.

DETAILED DESCRIPTION OF THE PREFERRED EMBODIMENTS

Figure 4:
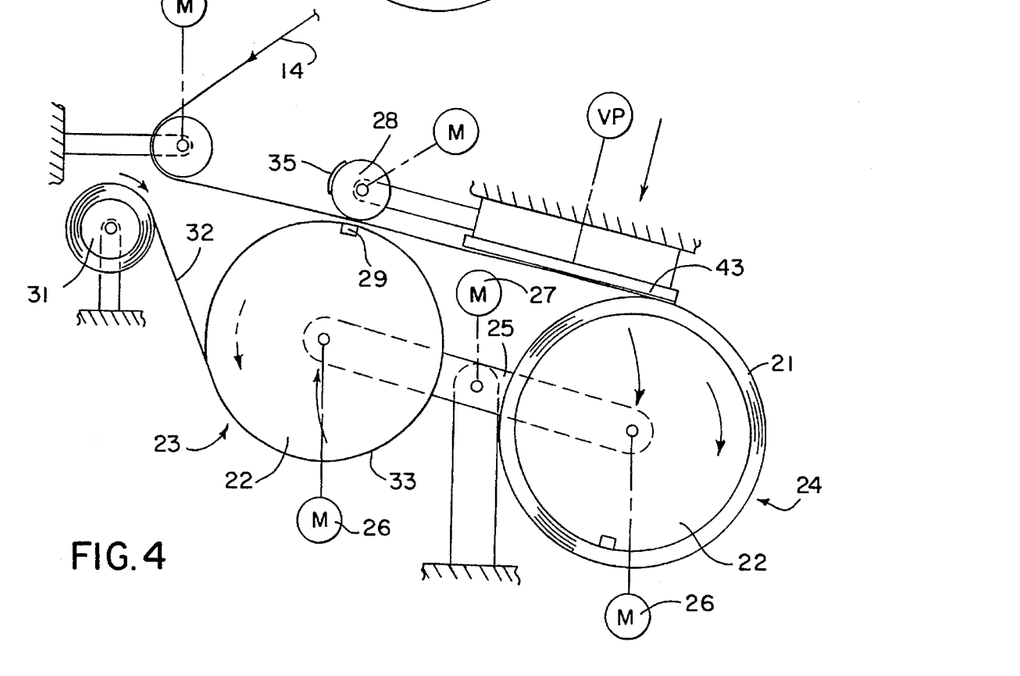
FIG. 4 is a similar schematic side elevation showing completion of the winding of the web on the translated web lay-up drum while the other lay-up drum is being wrapped with a backing sheet.
Figures 5, 6, 7, 8:
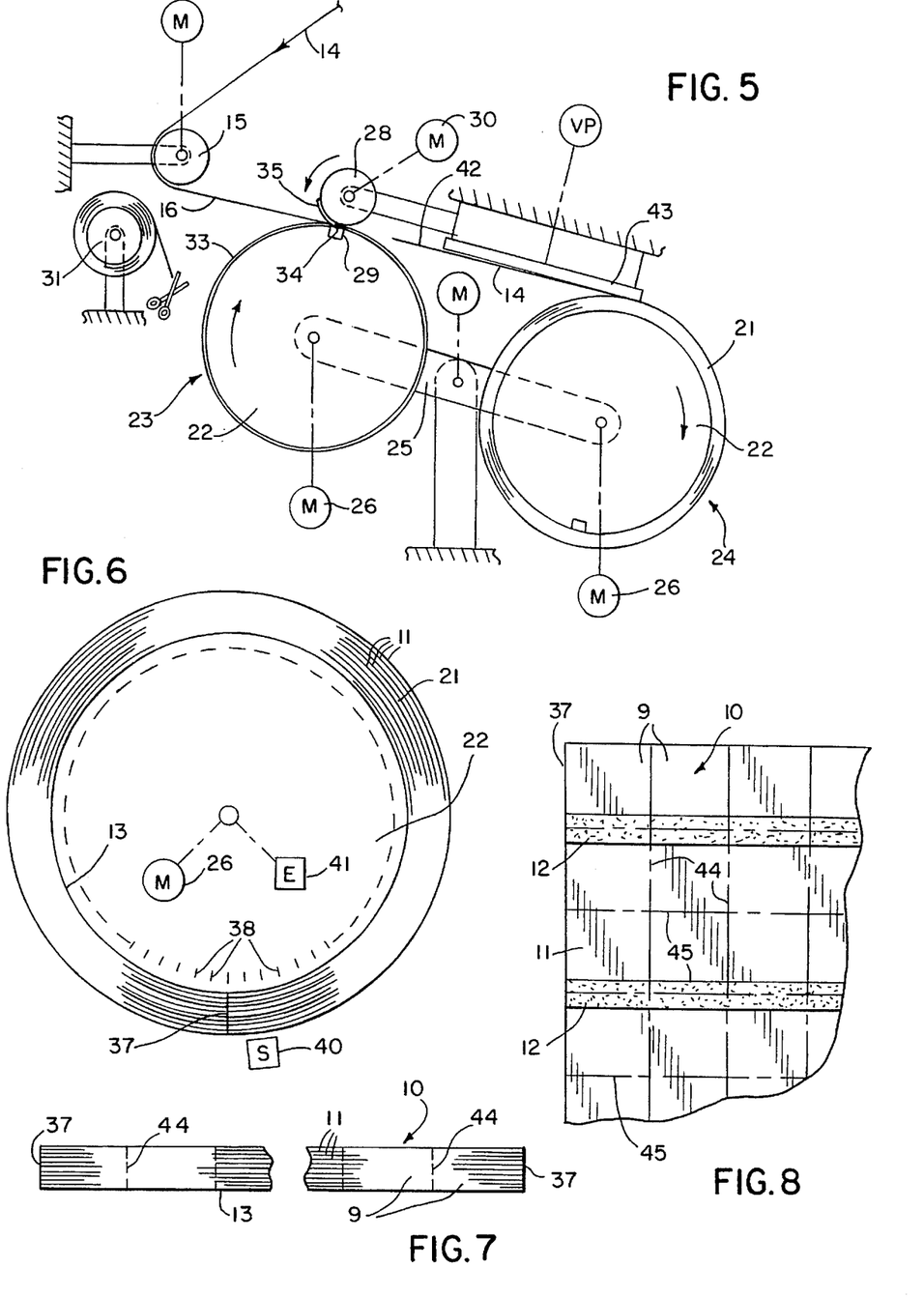
FIG. 5 is a side elevation similar to FIG. 2 showing simultaneous severing of the web being wrapped on one lay-up drum and the transfer thereof to the second lay-up drum.
FIG. 6 is an enlarged schematic end view of one lay-up drum showing the multi-layer cylindrical stack wrapped thereon.
FIG. 7 shows the multi-layer stack after it has been cut and unwrapped from the drum.
FIG. 8 is a plan view of the stack shown in FIG. 7 and indicating the cut lines on which the stack is cut to divide the same into a multiplicity of small pads of adhesive backed notes.

The product produced in accordance with the method and apparatus of the present invention is shown in FIGS. 7 and 8 and comprises a flat rectangular stack 10 of large individual paper sheets 11 each having a plurality of continuous zone coats of adhesive 12 applied to one side by which each sheet 11 in the stack adheres to the next adjacent sheet. The bottom sheet of the stack is attached to a backing sheet 13 having no adhesive applied to it and typically being of another type of paper or non-paper sheet, all in a known manner. In accordance with the invention, the flat rectangular stacks 10 are initially laid up in a cylindrical shape as shown in the sequence of process operations in FIGS. 1–5 and to be described hereinafter.

Figure 1:
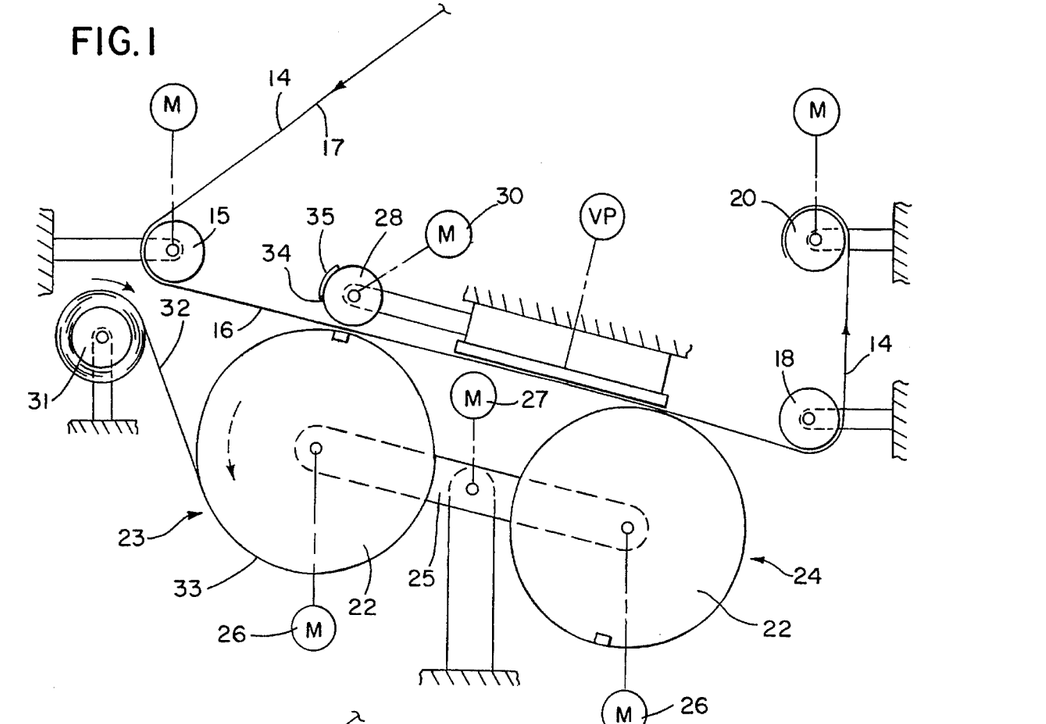
FIG. 1 is a schematic side elevation of the apparatus of the present invention shown operating in a start-up rewind mode.
Figure 2:
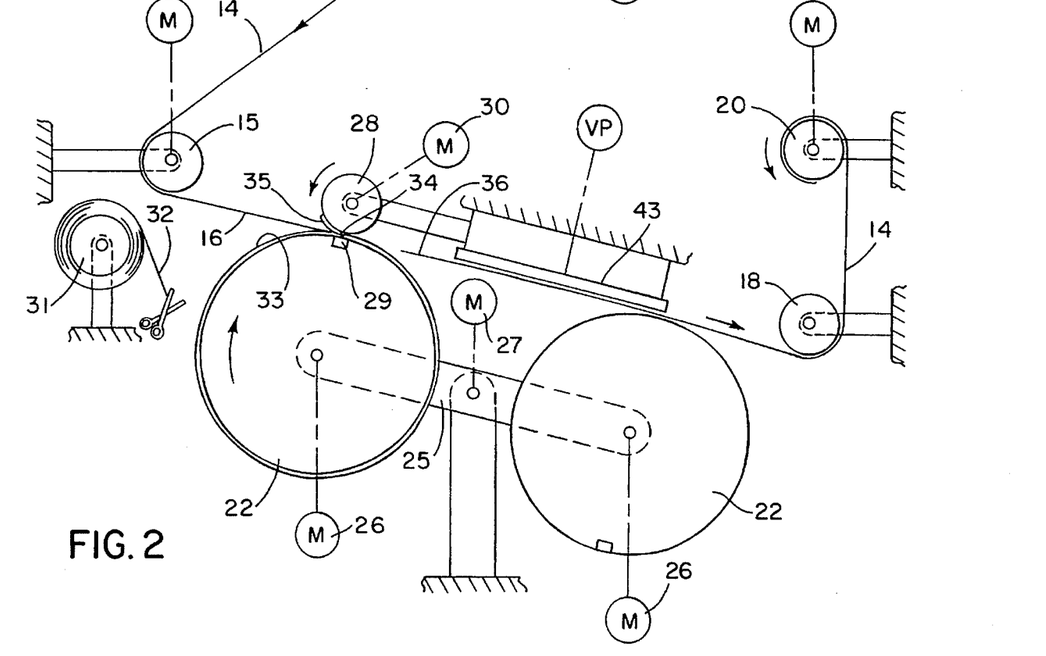
FIG. 2 is a schematic side elevation similar to FIG. 1 showing transition of the system from the start-up to the operating mode.

Referring to FIG. 1, the lay-up system of the present invention is shown in a preliminary rewind mode prior to start-up of the actual lay-up process. In this mode, a continuous web 14 of paper is fed at a constant speed into the lay-up apparatus by a drive roll 15. The roll 15 is preferably rubber covered to provide a firm friction drive for the web 14. Alternately, the web could be advanced through a pair of nip rolls. Upstream of the drive roll 15, and not shown in the drawings, the web 14 is provided with a series of laterally spaced continuous adhesive zone coats 12 (see FIG. 8) which, in turn, are preferably applied atop previously applied zone coats of a primer material, all in a known manner. The adhesive face 16 of the web 14 is positioned on the outside of the web as it passes around the drive roll 15 so that it faces generally downwardly in its passage through the lay-up apparatus. Either the adhesive face 16 or the opposite face 17 of the web may be plain or may carry some sort of printed indicia. In particular, the printing may comprise a uniformly repeating pattern which must be maintained in register with the printed indicia on the underlying sheets as the multi-sheet master stacks are laid up. The web 14 may be of any desired width, typically 4 feet (1.22 m).

The adhesive coated web 14 could also be supplied directly to the lay-up system of the present invention from a rewind roll. The finished web from the coater/printer could be wound, on an interim basis, onto a rewind roll from which it is subsequently supplied directly to the lay-up system. Use of rewind rolls provides the ability to run the upstream coating/printing system on a continuous basis and to have a ready supply of adhesive coated web for the lay-up system as well. It is also believed that the critical control of web tension in the lay-up process to be described is better facilitated by supplying the web directly from a rewind roll. This basic system will be described below with reference to FIG. 11.

The adhesive coated web 14, possibly also carrying printed indicia, is initially fed through the system and around an idler roll 18 at the downstream end from which it is directed to a rewind roll 20 where the web is accumulated until proper web coating, alignment, and speed are attained and the system is ready to be put into operation. In accordance with the preferred method of the present invention, the lay-up apparatus disclosed herein is operable on a continuous basis to form multi-layer cylindrical master stacks 21 of sheets 11 (see FIG. 6) which are subsequently cut to form the flat rectangular master stacks 10 of sheets described above.

The multi-layer cylindrical stacks 21 are wrapped sequentially on a pair of rotatable and translatable lay-up drums 22 which are movable between a web attaching position 23, upstream with respect to movement of web, and a web wrapping position 24 downstream thereof. The lay-up drums 22 are attached to the ends of a rotatable transfer arm 25. Each drum has its own drum drive motor 26 and the transfer arm is also driven by a separate motor 27. A web attaching and severing roll 28 is mounted on the opposite side of the web 14 and is driven by a roll drive motor 30. The attaching and severing roll 28 is also translatable between an operative position where it cooperates with the lay-up drum 22 in the web attaching position 23 and an inoperative position, as shown in FIG. 1, where it is moved out of the arc of rotation of the lay-up drums as they rotate on the transfer arm 25. The system also includes a backing sheet supply roll 31 from which a single layer wrap of a backing material web 32 is initially applied to the lay-up drum in the web attaching position 23. The backing sheet roll 31 may be located and oriented to wrap the backing material web 32 around the drum by rotation thereof in the counterclockwise direction indicated by the dashed line arrow on the drum in the web attaching position 23 of FIG. 1. The drum drive motor 26 may be operated in reverse to accommodate application of the backing material sheet 33 which is exactly equal in length to the circumference of the drum. It is preferable to utilize lay-up drums 22 having diameters as large as practical for purposes of tension which is applied to the web 14, as will be described. Also, the lay-up drum circumference should preferably equal an approximate multiple of the length of the individual note pads 9 (see FIG. 8) to be cut from the large master stack of sheets laid up on the apparatus. For example, the drum may have a circumference of 32 feet (9.75 m), which corresponds to a drum diameter of approximately 10.2 feet (3.1 m).

The backing sheet 33 may be adhered to the drum with an easily removable adhesive, held on the surface of the drum by vacuum applied from the inside thereof, or the backing sheet may be eliminated completely. If no backing sheet is used initially, the cylindrical surface of the drum may be coated with a suitable release agent and the web 14 applied directly to the drum surface. When the cylindrical master stack 21 is removed from the drum, it may be transferred directly onto a suitable backing sheet to form the resulting flat rectangular master stack 10.

With the backing material sheet 33 temporarily secured to the surface of the drum 22 in the web attaching position 23 and the web 14 being accumulated on the rewind roll 20, the lay-up drum 22 and the web attaching and severing roll 28 are brought up to peripheral speeds corresponding to the speed of the advancing web. Roll 28 includes a transversely extending cutoff knife 34, behind which in the direction counter to roll rotation is a soft rubber pad 35 which extends radially outwardly beyond the edge of the cutoff knife 34. The cutoff roll 28 is translated from the standby position shown in FIG. 1 to the operative position shown in FIG. 2 and, with the use of appropriate controls including for example rotational position encoders or the like, the edge of the cutoff knife 34 is caused to engage the moving web 14 along a transverse line across the lay-up drum 22 corresponding precisely to the butt edge defining the joint where the opposite edges of the backing material sheet 33 join. However, because the rubber pad 35 extends radially beyond the edge of the knife 34, the pad will actually make contact with the web before the knife and force the web into contact with the surface of the drum (actually into contact with the backing material sheet 33 attached to the drum) before the knife engages the web. The knife edge is adapted to provide a perforated cut without severing the web. For example, the cutting edge of the knife 34 may be interrupted with a series of equally spaced nicks along its length across the full width of the web. A transverse backing strip 29 made of a tough plastic material may be set in a recess or slot in the surface of the drum 22 along the knife cut line. The rubber pad 35 may extend circumferentially 5 to 10 inches (12.5 to 25 cm) back from the cutoff knife 34 to assure that the adhesive coated web is pressed firmly against the backing sheet. Simultaneously, a slight increase in speed or torque of the rewind roll 20 will break the perforated cut in the web, allowing the tail end 36 of the downstream portion of the web to be separated from the web being wrapped on the lay-up drum 22.

Figure 3:
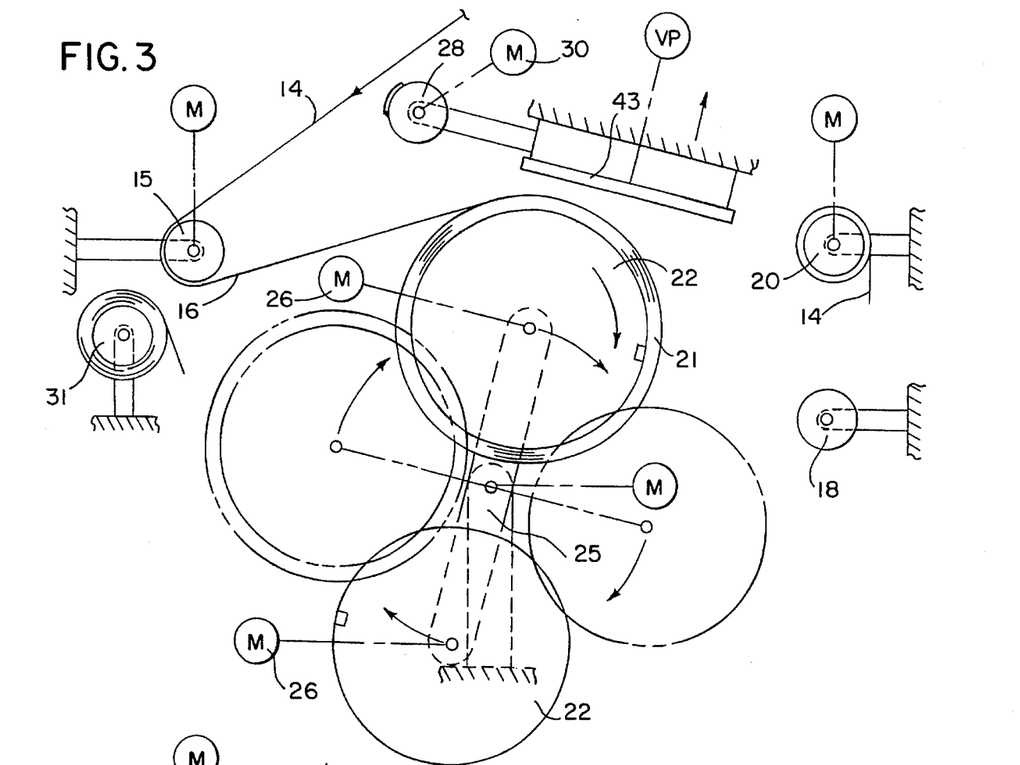
FIG. 3 is a similar schematic side elevation of the system showing translation of positions of the web lay-up drums while the web is being wound on one of them.

As soon as the web has been initially attached to the lay-up drum in the web attaching position 23, the knife roll 28 is moved back to its standby position and the transfer arm drive motor 27 is activated to rotate the transfer arm 25 and carry the lay-up drum on which the web is being wound to the web wrapping position 24, thereby exchanging positions with the empty lay-up drum 22, as shown in FIG. 3. During translation of the lay-up drums 22 between the attaching and wrapping positions 23 and 24, drum drive motor 26 on the drum to which the web has been attached is continued to be operated to cause the web to be wrapped thereon and, after the transfer arm has been rotated approximately 180°, winding of the web on the drum 22 which is now in the downstream position is continued, as shown in FIG. 4.

The lay-up drum 22 transferred to the wrapping position 24 continues to rotate and wind the web thereon until a selected number of wraps of the web are wound thereon corresponding to the number of sheets in the resulting note pads 9. For example, it is conventional in the industry to provide note pads of 100 sheets providing a pad thickness of ⅜ inch (about 1 cm). However, if the web were wound on the lay-up drum by applying a constant tension during winding, the resultant multi-layer cylindrical master stack 21 would take a permanent set such that, when the cylindrical stack was cut transversely and removed from the drum, it could not be flattened. In accordance with the preferred embodiment of the present invention, the adhesive coated web 14 is wrapped with a uniformly increasing tension such that each succeeding wrap of the web is caused to be in relatively greater tension than the wrap preceding it. This is accomplished by driving the drum drive motor 26 in a torque control mode to maintain a constantly increasing tension in the web between the constant speed web drive roll 15 and the tangent wrap point of the web on the drum 22. For example, to wind 100 wraps of the paper web 14 to provide a ⅜ inch (1 cm) thick stack of sheets, tension in the web would be increased from approximately 0 at the point of initial attachment of the web to the drum to a maximum at the point of the final wrap which would result in a maximum stretching or increase in web length of 0.625% (assuming an approximate 5 foot or 1.5 m drum radius). By using a large diameter drum, lower maximum web tension is needed and the corresponding total stretch in the web is also minimized. It is believed, however, that a practical maximum increase in web length of about 0.5% or less should be maintained. This could be accomplished by using a larger lay-up drum having a radius of 6.25 feet (approximately 1.9 m). The 0.5% increase indicated above is believed to be within the elastic limit or the tensile strength of the typical paper web. With proper control of tension, the wrapped master cylindrical stack 21 of sheets can be cut from the lay-up drum 22 (as on a stack cut line 37 in FIG. 6) and the cut stack may be unwrapped from the drum allowing the tensile stress differential in the web wraps to stabilize and form a flat master stack 10 of rectangular sheets of equal length in a square ended stack as shown in FIG. 7. However, the cylindrical master stack 21 may be cut to remove it from the drum along any generally transverse cut line which need not be either in the plane of the drum axis or parallel thereto. Regardless of the cut angle and transverse direction of the cut line, the resultant at master stack 10 may be readily end trimmed to a desired rectangular shape.

In the case in which the web is printed with a uniformly repeating pattern of indicia, it may be desirable to locate the printed indicia so that the patterns on each note in each pad are in direct alignment or register. In theory, controlled tension winding based on torque control of the drum drive motor 26, as described above, should result in print pattern register. However, torque control and resultant web tension may also be based on direct monitoring of the position of the print pattern with respect to index points on the lay-up drum and the use of adaptive control techniques to provide the motor torque necessary to maintain print pattern register. For example, with reference to FIG. 6, the drum could be provided with a pattern of equally spaced index points 38 corresponding to the print pattern repeat or some multiple thereof and a print pattern sensing device 40, such as an optical scanner, provides an indication of print pattern register with the appropriate index point. An encoder 41 provides a continuous output of drum position to allow registration to be maintained by adaptive control of drum drive motor torque.

While the desired number of web wraps are being applied to the lay-up drum in the web wrapping position 24, a backing material sheet 33, if used, is being applied to the other lay-up drum in the web attaching position 23, as shown in FIG. 4. The backing sheet is applied in the same manner described above with respect to FIG. 1 as, for example, by driving the drum in the opposite direction if desirable or convenient. However, the backing sheet could as well be applied in the opposite rotational direction, i.e. in the web wrapping direction. When the desired number of wraps has been applied to the downstream drum in the wrapping position 24, the knife roll 28 is moved from its FIG. 4 standby position into engagement with the web against the other lay-up drum in the web attaching position 23 to sever the web as shown in FIG. 5 and in essentially the same manner shown in FIG. 2 and previously described with respect to system startup. Simultaneously with cutting the web, the lead end of the upstream web portion is attached to the rotating drum in the web attaching position, also in the same manner previously described. Preferably, web tension is decreased somewhat just before the web is cut. The inherently greater torque being applied to the lay-up drum in the downstream wrapping position will cause the perforated web to break leaving a tail end 42 on the downstream portion which is needed to complete the last wrap on the downstream drum and must also be maintained in appropriate controlled tension for the winding being completed. Also, severing of the web is synchronized so that the upstream edge of the tail end 42 is laid onto the drum in alignment with the leading edge of the web first attached to the drum at the start of the wrapping sequence. To provide control and required tension in the tail end 42, a vacuum plenum 43 is moved from a standby position outside the rotational arc of the drums to an operative position to grab the tail end of the web as soon as it parts from the web initially attached to the upstream drum. The web is supported and held in the proper tension until continued rotation of the downstream drum receives the tail edge.

The vacuum plenum 43 is then returned to the standby position, rotation of the downstream drum 22 is halted and the multi-layer cylindrical master stack 21 is cut along the stack cut line 37 and removed from the drum. The stack may be removed with the drum in the wrapping position 24 or after rotation of the transfer arm 25 and return of the wrapped drum to the upstream web attaching position 23. The simultaneous translation of the upstream drum to which the new winding is being applied to the wrapping position is accomplished in the same manner shown in FIG. 3 and previously described. After the cylindrical master stack 21 and attached backing sheet 33 have been removed from the drum and flattened for cutting and further processing, another backing material sheet 33 supplied from the roll 31 is applied to the empty drum in the web attaching position 23, also as shown FIG. 1 and in the same manner previously described with respect thereto.

The flattened rectangular master stack 10 resulting from the process of the present invention is end-trimmed, if necessary, and cut on a series of transverse cut lines 44 and longitudinal cut lines 45 to form the multiplicity of note pads 9. As shown in FIG. 8, the longitudinal cut lines 45 bisect the adhesive zone coats 12 such that half of the adhesive creates the adhesive holddown strip along the edge of each paper note in the pad.

Figure 9:
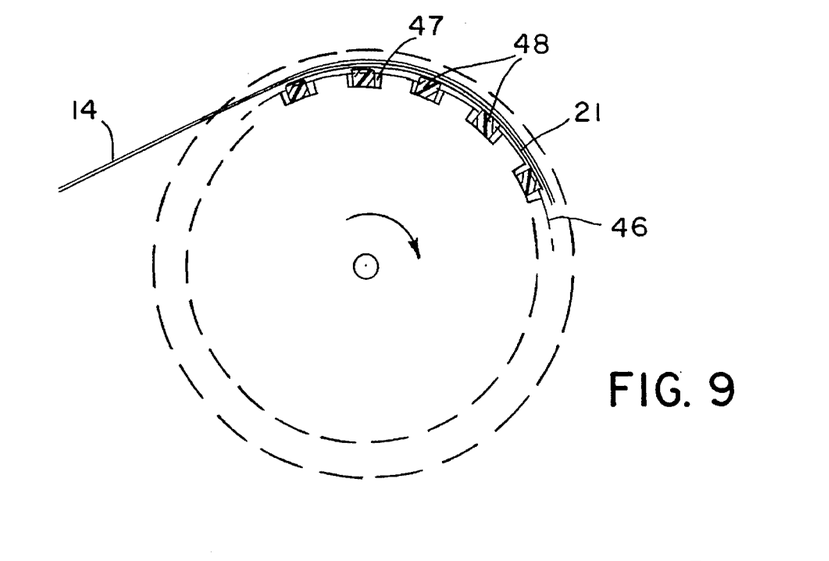
FIGS. 9 and 10 are schematic representations of alternate embodiments of lay-up drums utilizing modified web wrapping methods.

As an alternate to torque controlled winding on the rigid cylindrical surface of the lay-up drum 22, the surface of the drum could be provided with a relatively soft and compressible continuous cylindrical foam covered layer. The web 14 is attached to the drum surface and wound in generally the same manner as previously described for a selected number of wraps. However, the increasing level of applied web tension will result in an effective decrease in initial drum diameter because of compression of the foam layer. By careful control of web tension, the entire wrapping process may be performed utilizing a lay-up drum having a compressible surface the diameter of which is continuously reduced during web wrapping or a combination of drum compression and increasing web tension. Depending on the wrapping mechanism actually used, the amount of tension in previously applied wraps will actually decrease as outer wraps are applied. As a result, overall decreased tension levels may be utilized and, it is believed, smaller diameter lay-up rolls could also be used. Utilizing a wrapping process which combines drum compression and increasing web tension in which the web is wrapped on a drum surface which is initially compressible, it is likely that two independent web tension control regimes will be required, one during the period in which the drum surface is compressed and another while the wrapping is being completed with the drum diameter remaining constant. Care must be taken during the initial wrapping stage while the drum diameter is being compressed to control tension in a manner which will avoid buckling of web wraps previously applied. A schematic representation of one type of lay-up drum 46 which could be used to wrap a web 14 is shown in FIG. 9. The cylindrical surface of the drum 46 includes a series of circumferentially spaced and transversely extending slots 47. A compressible foam rubber bar 48 is placed in each slot 47 and is dimensioned such that its top surface extends initially beyond the outer surface of the drum 46. As the initial wraps progress to be wound on the drum, the foam bars 48 are compressed into the slots 47 until the inner wrap of the web 14 contacts the drum surface. Thereafter, the remaining web wraps are wound on the drum under controlled tension as previously described.

Figure 10:
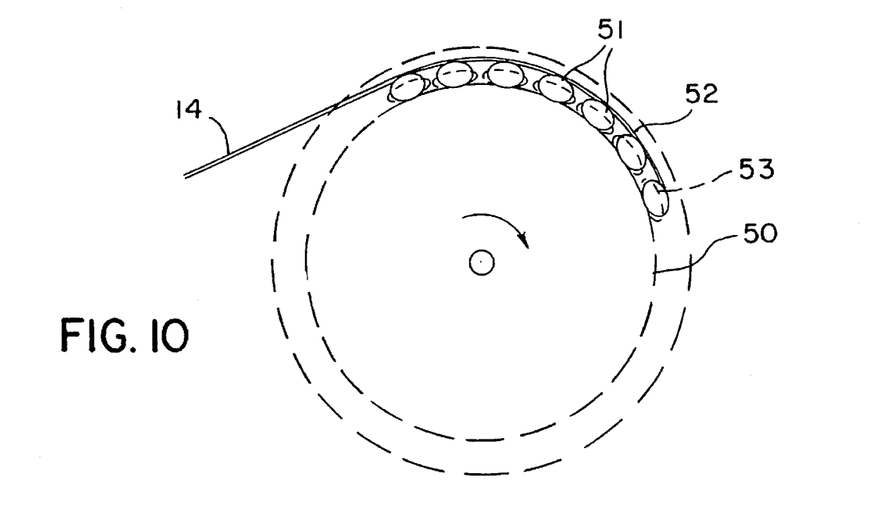

In lieu of a compressible foam rubber layer, the surface of a drum 50, shown in FIG. 10, could be provided with a series of transversely extending, flat inflatable tubes 51 laid side-by-side around the drum circumference. The tubes would be initially pressurized to provide a maximum starting drum diameter 52 and, as the wrapping process proceeds, the pressure in the tubes would be reduced to accommodate compression and reduction to a final drum diameter 53. Provision would also have to be made for retracting the backing strip 29 radially inwardly toward the center of the drum after the initially applied web 14 has been cut.

In addition to controlling web length in the lay-up process via purely mechanical methods, such as web tension control, web length during the wrapping process could also be controlled by controlling the moisture content of the paper web. By adjusting the amount of moisture applied to the web before it is wrapped on the drum, the moisture content of the paper web and thus the length of the web material may be continuously increased in a manner corresponding to the increase in diameter of the cylindrical master stack being formed on the drum. Moisture control might be effected by controlled direct application of water to the web or by control of humidity in an environment through which the web is passed prior to wrapping. Humidity control may include simultaneous temperature control.

Figure 11:
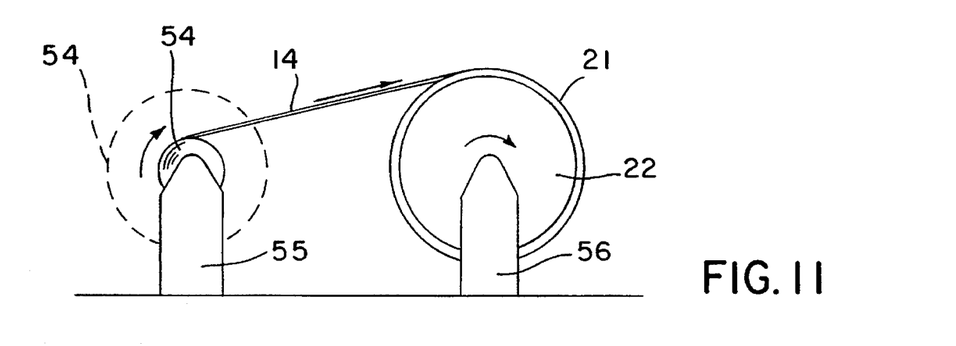
FIG. 11 is a schematic showing of a basic embodiment of the present invention in which the lay-up process is supplied from a rewind roll of web material.

As indicated previously, the basic process of the present invention may be operated completely independently from the preliminary web preparation process in which the web is provided with appropriate zone coats of a repositionable adhesive and possibly printed indicia as well. The adhesive coated web from the coating/printing process, instead of being passed directly into the lay-up system as previously described, is rewound into a web supply roll 54 which is shown in FIG. 11. The easily repositionable adhesive with which the web is coated permits rewinding and subsequent unwinding of the roll 54 without significant loss of adhesive. The rewound web supply roll 54 is mounted on a conventional roll stand 55 from which the web 14 may be fed at a constant linear speed directly onto the surface of the lay-up drum 22 suitably supported for driven rotational movement on a drum support stand 56. As each multi-layer cylindrical master stack 21 is completed, the web 14 may be cut and the process interrupted without concern for interruption of an upstream web coating or printing process. The necessary control of web tension as the web is being wrapped on the drum 22 is more easily attained with the web being supplied directly from the rewound supply roll 54. This basic system also allows complete physical separation of the web coating process from the web lay-up process. Thus, coated rewound web supply rolls 54 could be readily prepared and shipped to a different location for lay-up utilizing a single lay-up drum 22 in the manner shown in FIG. 11. With neither of the two processes dependent upon the other, both can be operated at maximum efficiency and optimum levels of quality control. A large single web supply roll 54 could be prepared with sufficient web material to operate a single lay-up drum for a full shift.

The apparatus and method of the present invention, in any of their various embodiments, may be utilized to make permanent laminates or laminated products of any desired thickness. For example, it is known to be difficult in the prior art to lay-up laminated paper products of more than several layers because of the need to supply each layer from a separate web source. In other words, it is difficult from a practical standpoint to utilize many individual running web sources to supply the layers for a laminate. Within the limits of web length control discussed herein, the process of the present invention permits a laminate of many more layers to be laid up from a single web source. A paper web with a full coat of a permanent adhesive on one side can be readily laid up in many layers utilizing the process of the subject invention. By utilizing the previously described web tension or length control techniques, a master cylindrical laminate is formed on the drum which, when subsequently transversely cut, will open into a flat permanent laminated body.

Various modes of carrying out the present invention are contemplated as being within the scope of the following claims particularly pointing out and distinctly claiming the subject matter which is regarded as the invention.

I claim:

1. A method for laying up multi-layer stacks of sheets from a continuous web of material having an adhesive coating on one side, said method comprising the steps of:
   (1) attaching a first leading edge of the web to the surface of a first rotatable drum;
   (2) rotating the first drum to cause winding of a selected number of wraps of the web thereon to form a multi-layer cylindrical master stack;
   (3) controlling web tension during winding to cause each succeeding wrap of the web to be in relatively greater tension than the preceding wrap;
   (4) cutting through the formed cylindrical stack generally transversely of the web; and,
   (5) unwrapping the cut stack from the drum to permit the tensile stress differential in the web wraps to stabilize to form a flat master stack of generally rectangular sheets of equal length.

2. The method as set forth in claim 1 including drum drive means for rotating the drum and wherein said tension controlling step comprises controlling the torque output of the drum drive means.

3. The method as set forth in claim 2 including rotatable web feed means for supplying the web to the drum and the additional step of driving said web feed means at a constant speed.

4. The method as set forth in claim 1 including the additional steps of:
   (1) providing a second rotatable drum;
   (2) mounting the drums on opposite ends of a rotatable transfer arm;
   (3) positioning the first drum in a web attaching position;
   (4) rotating the first drum during the web attaching step;
   (5) rotating the transfer arm during winding to move the second drum to the web attaching position; and,
   (6) repeating the web attaching step on the second drum by cutting the web thereon to provide a second leading edge for the second drum and a trailing edge for the final wrap on the first drum.

5. The method as set forth in claim 4 including the preliminary steps of:
   (1) continuously advancing the web past the drums;
   (2) accumulating the advancing web;
   (3) initially attaching the web to the first drum by causing the rotating drum surface to contact the moving web; and,
   (4) cutting the web on the drum surface to provide the first leading edge.

6. The method as set forth in claim 1 wherein the web is paper, and including the preliminary step of applying to the paper web a continuous zone coat of a repositionable adhesive material.

7. The method as set forth in claim 6 including the steps of:
   (1) attaching a backing sheet to the surface of the drum prior to attaching the web; and,
   (2) attaching the web to the backing sheet by placing the adhesive side of the web against the backing sheet.

8. The method as set forth in claim 7 wherein the backing sheet has a length equal to the circumference of the drum and including the additional steps of:
   (1) providing a rotary web cutoff knife having a blade positioned transversely of the web; and,
   (2) moving the cutoff knife into cutting engagement with the web to provide the leading edge in register with the edge of the backing sheet.

9. The method as set forth in claim 1 including the steps of:
   (1) coating the surface of the drum with a release agent; and,
   (2) winding the initial web wrap directly upon the coated surface.

10. The method as set forth in claim 9 including the step of placing the adhesive coated face of the flat master stack onto a backing sheet.

11. The method as set forth in claim 1 including the steps of:
    (1) providing the drum with a compressible outer surface defining an initial diameter; and,
    (2) winding a portion of the total web wraps in a manner to compress the drum surface to a selected final diameter.

12. A method for forming a laminated product of adhered sheets from a continuous web of material having an adhesive coating on one side, said method comprising the steps of:
    (1) attaching the web to the surface of a rotatable drum;
    (2) rotating the drum to cause winding of a selected number of wraps of the web thereon to form a cylindrical master laminate;
    (3) controlling web tension during winding to cause each succeeding wrap of the web to be in relatively greater tension than the preceding wrap;
    (4) cutting through the cylindrical master laminate generally transversely of the web; and,
    (5) unwrapping the cut cylindrical laminate from the drum to permit the tensile stress differential in the web wraps to stabilize to form a flat master laminate.

13. A method for laying up multi-layer stacks of sheets from a continuously advancing web of material having an adhesive coating on one side, said method comprising the steps of:
    (1) advancing the web tangentially with respect to the surface of a first rotatable lay-up drum in a web attaching position;
    (2) rotating the first drum at a peripheral surface speed equal to the speed of the advancing web;
    (3) causing the web to contact and become attached to the surface of the first drum;
    (4) severing the portion of the web downstream of the attachment;
    (5) winding the attached web on the rotating first drum for a selected number of wraps to form a first multi-layer cylindrical master stack;
    (6) controlling web tension during winding to create relatively greater tension in each succeeding wrap of the web; and,
    (7) cutting the cylindrical master stack generally transversely of the web to form a flat master stack of generally rectangular sheets of equal length.

14. The method as set forth in claim 13 comprising the preliminary steps of:
    (1) providing the one side of the web with a uniformly repeating pattern of indicia; and,
    (2) providing the surface of the first drum with indexing marks corresponding to the repeating pattern; and including the additional step of controlling web tension to synchronize the repeating pattern with the index marks.

15. The method as set forth in claim 13 including the steps of:

(1) mounting said first rotatable lay-up drum and a second rotatable lay-up drum on opposite ends of a rotatable transfer arm;

(2) rotating the transfer arm during winding to move the second lay-up drum to the web attaching position; and, (3) repeating the steps of claim 10 for the second lay-up drum upon completion of the first multi-layer cylindrical master stack.

16. A method for forming a laminated product of adhered sheets from a continuous web of paper material having an adhesive coating on one side, said method comprising the steps of:

(1) attaching the web to the surface of a rotatable drum;

(2) rotating the drum to cause winding of a selected number of wraps of the web thereon to form a cylindrical master laminate;

(3) controlling web moisture during winding to cause each succeeding wrap of the web to have a higher moisture content than the preceding wrap;

(4) cutting through the cylindrical master laminate generally transversely of the web; and, (5) unwrapping the cut cylindrical laminate from the drum to permit the web wraps to stabilize to form a flat master laminate.

17. An apparatus for laying up multi-layer stacks of sheets from a continuous web of material having an adhesive coating on one side, said apparatus comprising:

(1) a device for attaching a first leading edge of the web to the surface of a rotatable drum;

(2) a power source for rotating the drum to cause a selected number of wraps of the web to be wound thereon to form a multi-layer cylindrical master stack; and, (3) a power source controller for controlling web tension during winding to cause each succeeding wrap of the web to be in relatively greater tension than the preceding wrap; and, (4) means for cutting through the formed cylindrical stack generally transversely of the web and permit unwrapping the cut stack from the drum to allow the tensile stress differential in the web wraps to stabilize to form a flat master stack of generally rectangular sheets of equal length.

18. The apparatus as set forth in claim 17 wherein said controller is operative to control the torque output of the power source.

19. The apparatus as set forth in claim 17 wherein the continuous web comprises a rewound roll of material.

20. The apparatus as set forth in claim 17 wherein one side of the web is provided with a uniformly repeating pattern of indicia; the first drum includes indexing marks corresponding to the repeating pattern; and said controller is operative to synchronize the repeating pattern with the index marks.

21. An apparatus for laying up multi-layer stacks of adhesive backed sheets from an advancing web of material having an adhesive coating on one side, said apparatus comprising:

a first rotatable lay-up drum having its axis of rotation parallel to the web and normal to the direction of web travel;

a rotatable web attaching and severing roll having its axis of rotation parallel to the axis of the first drum;

means for advancing the web between and tangentially with respect to the surfaces of the first drum and the roll;

means for rotating said drum and said roll at respective peripheral surface speeds corresponding to the speed of the web;

means for providing relative translation of the roll and the drum into engagement with the web to place the web into attaching engagement with the drum and to sever the attached web from the web portion downstream;

means for rotating the drum to wind the web thereon for a selected number of wraps applied in a manner to create relatively increasing tension in each succeeding wrap to form a multi-layer cylindrical master stack; and, means for cutting the cylindrical stack generally transversely of the web to form a flat master stack of adhesively attached sheets of substantially equal length.

22. The apparatus as set forth in claim 21 including:

a second rotatable and translatable lay-up drum;

a transfer arm rotatably supporting said first and second lay-up drums on opposite ends thereof, means for rotating the transfer arm to translate the lay-up drums between a web attaching position and a web wrapping position; and, wherein said web attaching and severing roll is operable to simultaneously attach the web to the lay-up drum located in the attaching position and sever the web from the tail end of the final wrap on the lay-up drum located in the wrapping position.

23. The apparatus as set forth in claim 22 including means for maintaining tension in the tail end of the final wrap after the web is severed.

* * * * *